Dec. 6, 1949     J. H. MILLSTEIN     2,490,368

CANDY CONTAINING HORN NOVELTY

Filed April 14, 1947

Inventor

J. H. MILLSTEIN

By Bryant & Lowry

Attorneys,

Patented Dec. 6, 1949

2,490,368

UNITED STATES PATENT OFFICE 2,490,368

CANDY CONTAINING HORN NOVELTY

Jacob H. Millstein, Jeannette, Pa.

Application April 14, 1947, Serial No. 741,262

1 Claim. (Cl. 46—11)

This invention relates to candy container novelties and more specifically to a conical glass or plastic container having a plastic flared horn portion attached thereto at its closed end and a plastic whistle portion attached to the open end to form a part of the closure therefor.

The object of this invention is to form an attractive candy container novelty having the appearance of a horn with a transparent body filled with colored candies.

Another object is to make a candy container having a glass or plastic hollow body portion open at one end, a plastic whistle forming a closure for said end, and a plastic flared horn end portion at the other end.

Another object is to make a decorative candy container in the form of a horn, comprising a transparent hollow conical body portion open at the small end, a whistle portion attachable to said small end to hold a closure disc thereover, and a flared horn end portion attachable to the large end of said body portion.

Another object is to provide the attachable portions of the container defined above with screw connections, and a simple circular disc fitting over the open end and under the whistle portion.

Another object is to form a tone chamber for the whistle portion in the above construction so that it will be closed by the circular disc when the screw connection is in place.

A still further object is to make said tone chamber large enough to permit the use of a pith ball, bean, pea, or other substantially spherical bit of light material therein for producing a warbling whistle, if desired.

Figure 1:
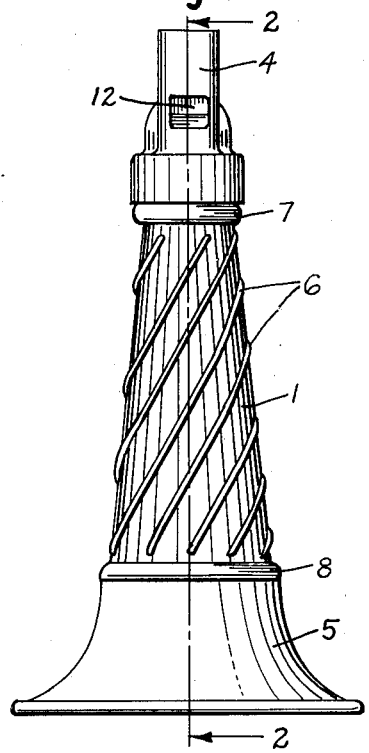
Figure 2:
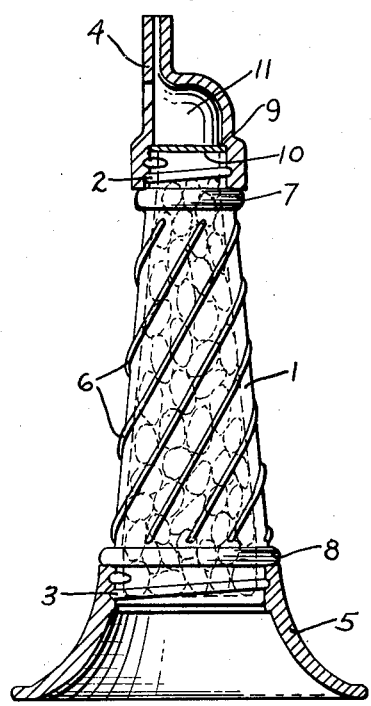
Figure 3:
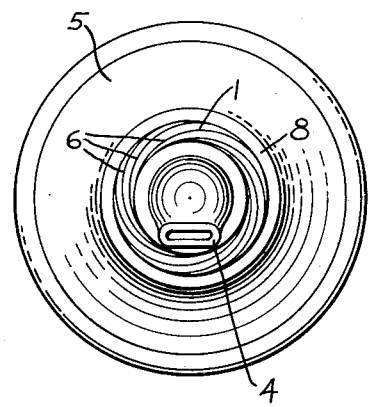

Other and more specific objects will appear in the following detailed description of a preferred form of device made in accordance with the present invention, having reference to the accompanying drawing, wherein:

Figure 1 is a front elevational view of the device, using the flared horn end portion as a base, Figure 2 is a sectional view thereof taken on the line 2—2 of Figure 1, except for the container body portion which is shown in full, and Figure 3 is a plan view of the device.

The device illustrated comprises a generally conical or tapered cylinder hollow container body 1 of glass or other transparent material, open at its small end and provided with screw connections 2 and 3 at both ends, the smaller end screw connection 2 being for the whistle portion 4 made of plastic material, the screw connection 3 at the other end being for a flared horn portion 5 preferably made of plastic material.

The container body portion may have a series of decorative helical ridges 6 formed thereon as shown, and is further provided with shoulder flanges 7 and 8 against which the whistle portion 4 and the horn portion 5 may be tightly screwed, respectively, to form a rigid assembly.

The whistle portion is further provided with an internal shoulder 9 to press around the edge of a disc 10 of cardboard or other sealing material so as to seal the open end of the container body 1 when the whistle portion 4 is screwed tightly against the shoulder flange 9.

Bright colors used on the several parts and on the candy inside the container may produce very attractive novelties, which are simultaneously in the nature of amusements, since the whistle portion will actually whistle when in place on the container, either with or without the disc 10 in place. However, if there is some candy in the container, the use of the disc will prevent any accidental flow of saliva down into the container body, and will produce a higher tone in accordance with the length of the tone chamber 11. This chamber may be made large enough to accommodate a pea, or other substantially spherical bit of light-weight material, whereby a warbling note may be obtained. This sphere obviously has to have a diameter which is larger than the height of the opening 12 in the front of the whistle portion 4, so that it would not fall out of chamber 11.

The disc 10 has a further function and that is to control the musical note emitted upon blowing the whistle. Thus, with the body 1 empty and the disc in place a high note will be emitted but, if the disc be removed, a much lower note will be sounded. Accordingly, the pitch of the instrument may be varied at will between high and low whether the disc is used or omitted.

It is not believed to be necessary to define the operation or assembly of this device, since it is obvious from its construction, as described.

No painting is necessary to provide attractive coloring of the device, since the body portion is transparent glass filled with vari-colored candies, and the end portions may be molded out of colored plastic materials of any suitable colors. This construction lends itself to cheap quantity production, yet provides very attractive as well as practical devices.

Obvious modifications in form and attachment of the several parts may be made without departing from the spirit and scope of this invention as defined in the appended claims.

What is claimed, is:

In a combined container and whistle, a hollow frusto-conical body closed at its larger end and provided with an open externally threaded neck at its smaller end, a disc seated on the neck to close the opening thereof, said disc being removable from and replaceable on said neck, and a whistle having an internally threaded annular flange at its lower end adapted to be screwed on said neck and provided with an internal annular shoulder engaging and holding said disc in place when the disc is on the neck, said hollow body forming a tone-controlling chamber for the whistle upon removal of the disc.

JACOB H. MILLSTEIN.

REFERENCES CITED

The following references are of record in the file of this patent:

UNITED STATES PATENTS

| Number | Name | Date |
|---|---|---|
| D. 120,672 | Harris | May 21, 1940 |
| 762,818 | Garwood | June 14, 1904 |
| 938,225 | Dowsing | Oct. 26, 1909 |
| 1,491,809 | Macchia | Apr. 29, 1924 |
| 1,734,528 | Paull et al. | Nov. 5, 1929 |
| 1,765,646 | Bauer | June 24, 1930 |
| 2,175,006 | Tilson | Oct. 3, 1939 |
| 2,294,538 | Chaffin | Sept. 1, 1942 |

FOREIGN PATENTS

| Number | Country | Date |
|---|---|---|
| 4,437 | Great Britain | A. D. 1888 |